United States Patent
Baba

[11] Patent Number: 5,237,160
[45] Date of Patent: Aug. 17, 1993

[54] BAR CODE SCANNER HAVING HOLOGRAM

[75] Inventor: Nobuyuki Baba, Sagamihara, Japan

[73] Assignee: Ricoh Company, Ltd., Tokyo, Japan

[21] Appl. No.: 993,469

[22] Filed: Dec. 15, 1992

Related U.S. Application Data

[63] Continuation of Ser. No. 560,569, Jul. 31, 1990, abandoned.

[30] Foreign Application Priority Data

Aug. 2, 1989 [JP] Japan ................... 1-200913

[51] Int. Cl.⁵ .................. G06K 7/10; G02B 5/32; G02B 26/10; G02B 27/44
[52] U.S. Cl. .................... 235/457; 235/467; 359/18
[58] Field of Search .......... 235/457, 467, 454; 359/18, 17, 212

[56] References Cited

U.S. PATENT DOCUMENTS

| | | | |
|---|---|---|---|
| 3,370,176 | 2/1968 | Ett et al. | 359/212 |
| 4,470,659 | 9/1984 | Funato | 359/18 |
| 4,593,967 | 6/1986 | Haugen | 359/18 |
| 4,626,062 | 12/1986 | Ishikawa | 359/18 |
| 4,647,143 | 3/1987 | Yamazaki et al. | 359/18 |
| 4,753,503 | 6/1988 | Day et al. | 359/18 |
| 4,870,274 | 9/1989 | Herbert et al. | 235/467 |
| 4,939,356 | 7/1990 | Rando et al. | 235/467 |
| 4,967,076 | 10/1990 | Schuhmacher et al. | 235/467 |
| 4,971,410 | 11/1990 | Wike, Jr. et al. | 235/467 |
| 4,999,482 | 3/1991 | Yang | 235/457 |

FOREIGN PATENT DOCUMENTS

| | | |
|---|---|---|
| 59-22992 | 5/1984 | Japan. |
| 60-254112 | 12/1985 | Japan. |
| 63-156293 | 6/1988 | Japan. |
| 63-218914 | 9/1988 | Japan. |

*Primary Examiner*—Eugene R. LaRoche
*Assistant Examiner*—Michael C. Kesssell
*Attorney, Agent, or Firm*—Oblon, Spivak, McClelland, Maier & Neustadt

[57] ABSTRACT

A bar code scanner includes a semiconductor laser device for emitting a light beam, a hologram disc on which a grating is formed, the hologram disc rotating around a predetermined axis, an incident optical system provided for perpendicularly projecting the light beam emitted from the light source onto the grating formed on the hologram member, a first optical system which projects the light beam passing through the grating formed on the hologram member onto the medium, and a second optical system for guiding the light beam reflected by the medium to a detector. The first optical system includes a plurality of mirrors arranged under the hologram disc so as to surround the axis of rotation of the disc so that each of the mirrors reflects light diffracted by the hologram disc and thereby forms a scanning line.

11 Claims, 7 Drawing Sheets

FIG. IA
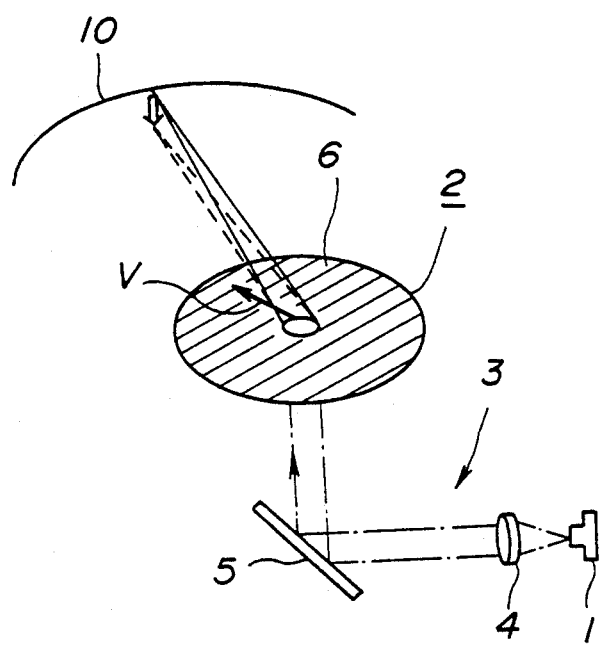
FIG. IB
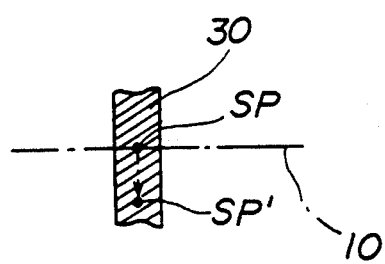

BAR CODE SCANNER HAVING HOLOGRAM

This application is a continuation of application Ser. No. 07/560,569 filed on Jul. 31, 1990, now abandoned.

BACKGROUND OF THE INVENTION

The present invention generally relates to a bar code scanner having a hologram, and particularly to a bar code scanner having a hologram which is capable of exactly reading a bar code.

Many types of laser bar code scanners have been proposed.

First, Japanese Laid-Open Patent Application No. 60-254112 discloses a laser bar code scanner. This laser bar code scanner has two hologram discs. One of the hologram discs is stacked on the other one. Each of these hologram discs has a diffraction grating formed by use of a hologram. These two hologram discs respectively have diffraction functions in which diffraction directions are opposite to each other. At least one of these hologram discs has a diffraction pattern which is symmetrical to an axis of the hologram disc. In this type of laser bar code scanner, when a wave length of a light beam emitted from a light source, such as a laser diode, changes, a position where the light beam focuses on a scanning surface is prevented from changing.

Second, Japanese Laid-Open Patent Application No. 63-218914 also discloses a laser bar code scanner. This laser bar code scanner has at least two band-shaped holograms. These band-shaped holograms are arranged so as to cross each other on a reading window. The light beam emitted from the light source passes through the band-shaped holograms so that the light beam passing through the band-shaped hologram scans a medium on which the bar code is recorded. In this laser bar code scanner, it is possible to make the structure thereof small.

Third, Japanese Laid-Open Patent Application No. 63-156293 discloses another laser bar code scanner. This laser bar code scanner forms a scanning pattern which has a plurality of scanning lines. In the plurality of scanning lines, the scanning directions differ from each other. This laser bar code scanner has a mirror group having a plurality of mirrors, each of the mirrors corresponding to one of the scanning lines, and a common mirror. Light beams reflected by the mirrors in the mirror group are respectively reflected by the common mirror so that the light beams reflected by the common mirror are directly projected onto the medium recording the bar code. In this laser bar code scanner also, it is possible to make the structure thereof small.

Fourth, a laser bar code scanner as follows has been proposed. In this laser bar code scanner, a light beam emitted from the light source is incident to a hologram formed on a rotated disc so that the the light beam passing through the hologram scans the medium recording the bar code. Then the light beam reflected by the medium is incident to the same hologram or another hologram which has the same focus position as the hologram through which the light beam from the light source passes. Finally, information is read out due to the detecting of the light beam passing through the same hologram or the other hologram above mentioned.

In the first conventional bar code scanner described above, it is possible to prevent the position where the light beam focuses on the scanning surface from changing in a direction (sub scanning direction) perpendicular to the scanning direction (main scanning direction) due to the changing of the wave length of the light beam. However, the light beam incident to the hologram disc is inclined to the surface of the hologram disc by a predetermined angle so that it is difficult to prevent the position where the light beam focuses on the scanning surface from changing in the main scanning direction due to the changing of the wave length of the light beam. Thus, when the light beam passing through the hologram discs scans the medium recording the bar code, a case occurs where the light beam discontinuously scans the medium in the main scanning direction. The discontinuous scanning causes a reading bar code error.

In the second conventional bar code scanner described above, when the number of the scanning lines which cross each other becomes large, it is necessary to stack many holograms. Thus, there are disadvantages in that it is difficult to make the holograms and the amount of light absorbed in the holograms increases.

In the third conventional bar code scanner described above, it is necessary to provide a particular optical system for transmitting the light beam to the common mirror. Thus, the variety of possible designs is restricted.

In the fourth conventional bar code scanner described above, a case occurs where the light reflected by the hologram disc is, as a disturbance light, incident to the photo detector. In order to prevent the disturbance light from being incident to the photo detector, it is necessary to increase the degree of the inclination of the light beam incident to the hologram disc. However, if the degree of the inclination of the light beam incident to the hologram disc is increased, an aberration is easily generated.

SUMMARY OF THE INVENTION

Accordingly, a general object of the present invention is to provide a novel and useful bar code scanner having a hologram in which the disadvantages of the aforementioned prior art are eliminated.

A more specific object of the present invention is to provide a bar code scanner having a hologram in which it is possible to prevent the position where the light beam focuses on the scanning surface from changing in the main scanning direction when the wave length of the light beam changes.

Another object of the present invention is to provide a bar code scanner having a hologram which has high reliability.

The above objects of the present invention can be achieved by a bar code scanner comprising light source means for emitting a light beam, a hologram member on which a grating is formed, the hologram member rotating around a predetermined axis, incident optical means provided between the light source and the hologram member for perpendicularly projecting the light beam emitted from the light source onto the grating formed on the hologram member, a first optical system provided between the hologram member and a medium on which a bar code is recorded, for Projecting the light beam passing through the grating formed on the hologram member onto the medium, and a second optical system for detecting the light beam reflected by the medium.

Additional objects, features and advantages of the present invention will become apparent from the following detailed description when read in conjunction with the accompanying drawings.

BRIEF DESCRIPTION OF THE DRAWINGS

FIG. 1A is a schematic diagram showing the principle of the present invention;

FIG. 1B is an illustration of the state where a focused position of the light beam changes;

DESCRIPTION OF THE PREFERRED EMBODIMENTS

Figure 2A:
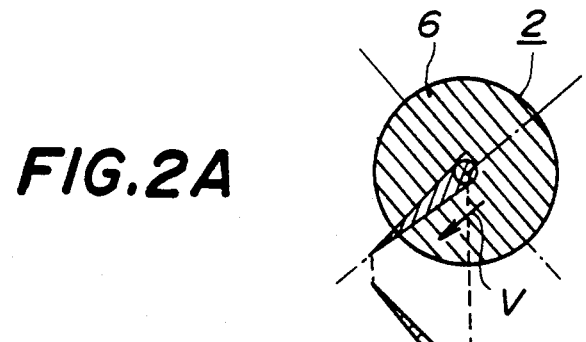
FIGS. 2A through 4B show the state where a light beam diffracts in a direction of a grating vector of the diffraction grating when the light beam is incident to the diffraction grating in a perpendicular direction to the surface of the diffraction grating.
Figure 2B:
Figure 3A:
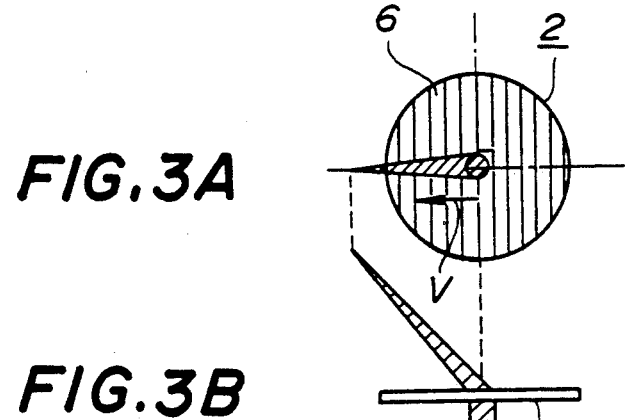
Figure 3B:
Figure 4A:
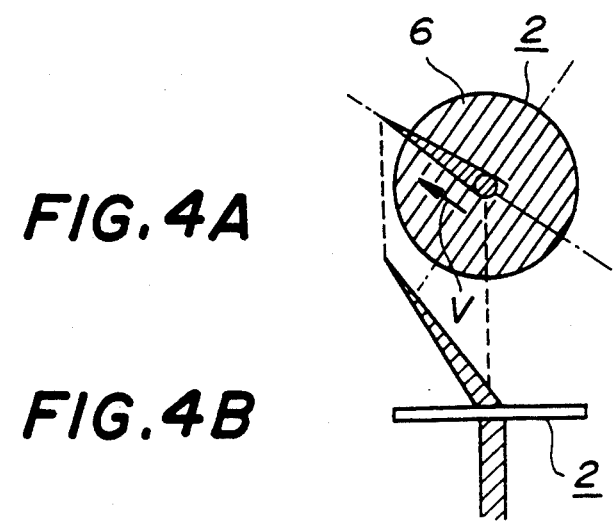
Figure 4B:
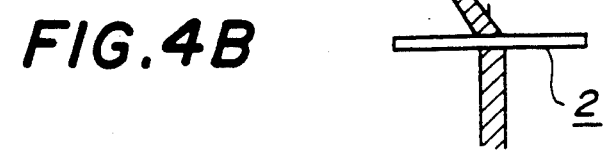

A description will now be given of the principle of the present invention with reference to FIGS. 1A though 4B.

FIG. 1A shows the basic structure of a bar code scanner according to the present invention. Referring to FIG. 1A, a light beam emitted from a semiconductor laser device 1 which is a light source is incident to a collimator lens 4. The light beam passing through the collimator lens 4 is made of parallel rays. The light beam from the collimator lens 4 is reflected by a mirror 5 and then is perpendicularly incident to a hologram disc 2. That is, due to an incident optical system 3 having the collimator lens 4 and the mirror 5, the light beam emitted from the semiconductor laser device 1 is perpendicularly incident to the hologram disc 2. The light beam is usually diffracted by a grating 6 in a direction of a grating vector (V) thereof as shown in FIGS. 2A and 2B, FIGS. 3A and 3B and FIGS. 4A and 4B. Therefor, when the hologram disc 2 rotates, the light beam diffracted by the grating 6 of the hologram disc 2 is rotated so that the light beam scans on a predetermined line in space. That is, the predetermined line corresponds to a scanning line 10.

For example, when the temperature of the semiconductor laser device 1 changes due to the changing of the atmospheric temperature and the like, the wave length of the light beam emitted from the semiconductor laser device 1 changes. Then, when the wave length of the light beam changes, the direction in which the light beam is diffracted by the grating 6 changes suddenly. In the case where the light beam is perpendicularly incident to the grating 6, when the wave length of the light beam changes, the light beam diffracted by the grating 6 moves on a plane defined by the grating vector (V) and the incident light beam. Therefor, when the wave length of the light beam emitted from the semiconductor laser 1 changes, the focused position of the light beam diffracted by the grating 6 changes in a direction substantially perpendicular to the scanning line 10. For example, as shown in FIG. 1B, the focused position Sp of the light beam moves in the direction perpendicular to the scanning line 10 so that the light beam is focused at a position Sp'. When the bar code recorded on the medium is read, the light beam scans in a direction substantially perpendicular to each bar 30 of the bar code, as shown in FIG. 1B. Thus, even if the focused position of the light beam moves in the direction perpendicular to the scanning line 10, there is no case where the light beam discontinuously scans in a direction perpendicular to each bar 30 of the bar code. As a result, reading errors are prevented from occurring. In this case, the spot of the light beam which is incident to the grating 6 has a circular shape so that the spot size of the light beam diffracted by the grating 6 and the focal depth thereof are constant in every direction.

Figure 5:
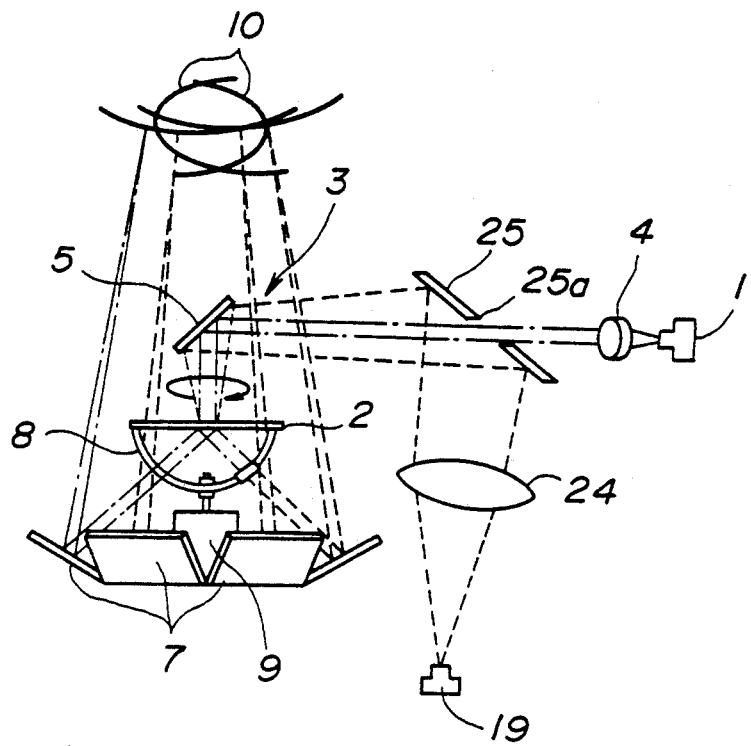
FIG. 5 shows a first embodiment of the present invention.

A description will now be given of a first embodiment of the present invention with reference to FIG. 5. Referring to FIG. 5, the hologram disc 2 is supported by a supporting frame 8. The supporting frame 8 is fixed to a shaft of a motor 9 so that the hologram disc 2 rotates due to the driving of the motor 9. The light beam emitted from the semiconductor laser device 1 passes through the collimator lens 4 and a hole 25a of a mirror 25 and is incident to the mirror 5. The light beam reflected by the mirror 5 is perpendicularly incident to the center of the hologram disc 2. A plurality of mirrors 7 are arranged around the motor 9. The light beam which is perpendicularly incident to the hologram disc 2 is diffracted by the grating 6 formed on the hologram disc 2 in the direction of the grating vector(V). Thus, when the hologram disc rotates, the diffracted light beam also rotates around the rotational axis of the hologram disc 2. The diffracted light beam is successively incident to each of the mirrors 7 in accordance with the rotation of the hologram disc 2. Then, the light beam reflected by each of the mirrors 7 is focused at a predetermined position in space. Therefor, a plurality of scanning lines 10, which cross each other, is repeatedly formed at predetermined areas in space while the hologram disc 2 rotates. Each of the scanning lines 10 corresponds to one of the mirrors 7.

In the case described above, the light beam is diffracted in two directions which are parallel to the grating vector (V) so that two diffracted light beams are generated. However, one of the diffracted beams is intercepted by the supporting frame 8. Then only one of the diffracted light beams is incident to each of the mirrors 7.

The light beam reflected by the medium recording the bar code returns on the same optical path as the light beam for forming the scanning lines 10. Then, the light beam passing the mirror 7, the hologram disc 2 and the mirror 5 is reflected by the mirror 25. The light reflected by the mirror 25 passes through a lens 24 and is incident to an optical detector 19. Information corresponding to the bar code is generated by a processing system (not shown in FIG. 5) based on the detecting signal output from the optical detector 19.

According to the first embodiment, a plurality of the scanning lines 10 is generated so that reading errors decrease and the reliability of the bar code scanner increases.

Figure 6:
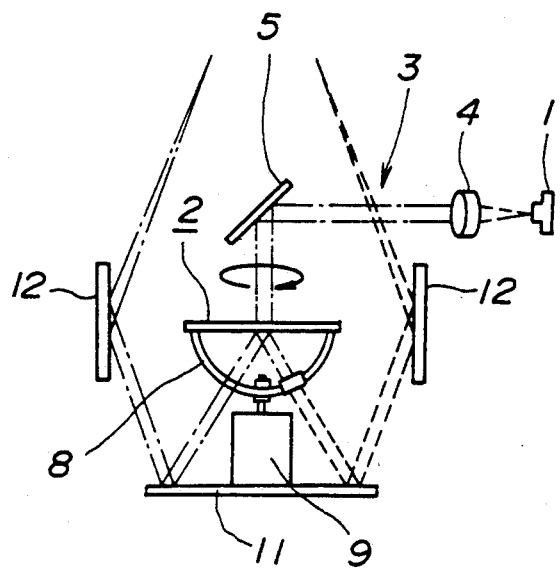
FIG. 6 shows a second embodiment of the present invention.

A description will now be given of a second embodiment of the present invention with reference to FIG. 6. In the second embodiment, a common mirror is used instead of the mirrors 7 shown in FIG. 5. In FIG. 6, for the sake of simplicity, a detecting system which detects the light beam reflected on the medium recording the bar code is omitted. Those parts which are the same as those shown in FIG. 5 are given the same reference numbers.

Referring to FIG. 6, the bar code scanner has the semiconductor laser 1, the collimator lens 4, the mirror 5, the hologram disc 2 supported by the supporting frame 8 and the motor 9 rotating the supporting frame 8. The bar code scanner also has the common mirror 11 and a plurality of mirrors 12. The common mirror 11 is provided under the motor 9. The mirrors 12 are arranged around the hologram disc 2. The light beam which is perpendicularly incident to center of the hologram disc 2 is diffracted by the grating 6. When the hologram disc 2 is rotated, the diffracted light beam rotates around the rotational axis of the hologram disc 2. Then, the diffracted light beam is reflected by the common mirror 11. The light beam reflected by the common mirror 11 is incident to one of the mirrors 12 corresponding to the diffraction direction of the light beam. The light beam reflected by one of the mirrors 12 is focused at a predetermined position in space. Thus, a plurality of scanning lines which cross each other are formed in space. Each of the scanning lines corresponds to one of the mirrors 12. Due to the use the common mirror 11 shown in FIG. 6, it is possible to provide a bar code scanner which is compact.

A description will now be given of a third embodiment of the present invention with reference to FIGS. 7A through 10. In the third embodiment, the scanning angle of the light beam diffracted by the grating is expanded.

Figure 7A:
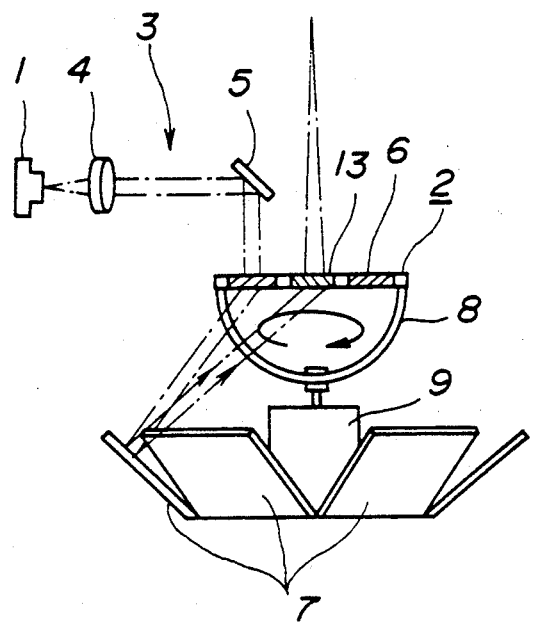
FIGS. 7A shows a third embodiment of the present invention.

In FIG. 7A, for the sake of simplicity, a detecting system which detects the light beam reflected on the medium recording the bar code is omitted. Those parts which are the same as those shown in FIG. 5 are given the same reference numbers.

Figure 7B:
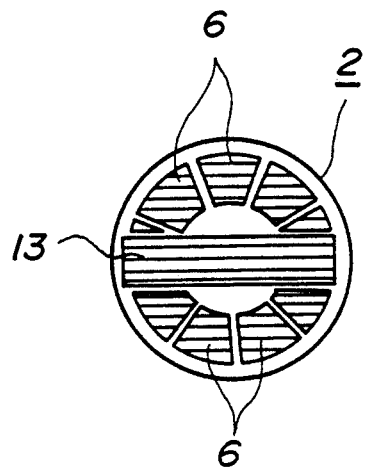
FIG. 7B is a plan view of a hologram disc used in a bar code scanner shown in FIG. 7A.

Referring to FIG. 7A, the light beam emitted from the semiconductor laser 1 is, via the collimator lens 4 and the mirror 5, perpendicularly incident to one of the gratings 6 formed on the hologram disc 2. As shown in FIG. 7B, a plurality of the gratings 6 are formed on the the hologram disc 2, and then another grating 13 is formed on the diameter line of the hologram disc 2. The grating 13 has the same diffraction direction as each of the gratings 6. Because the grating 13 and the gratings 6 are formed on a surface of the hologram disc 2, the grating 13 has the same rotational axis as each of gratings 6. The light beam diffracted by each of the gratings 6 is reflected by each corresponding one of the mirrors 7 provided around the motor 9. Then the light beam reflected by each of the mirrors 7 is incident to the grating 13 formed on the hologram disc 2. The light beam diffracted by the grating 13 is focused at a predetermined position in space. Then, due to the rotation of the hologram disc 2, a plurality of the scanning lines are formed.

A description will now be given of a reason why the scanning angle of the light beam diffracted by the grating 13 is expanded with reference to FIG. 8.

Figure 8:
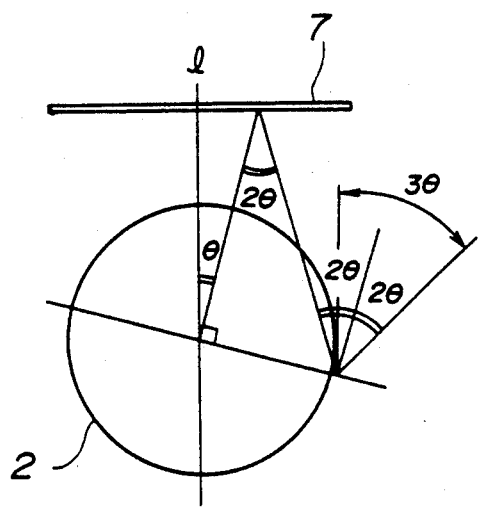
FIG. 8 illustrates the principle in which a scanning angle of a scanning line increases.
Figure 9:
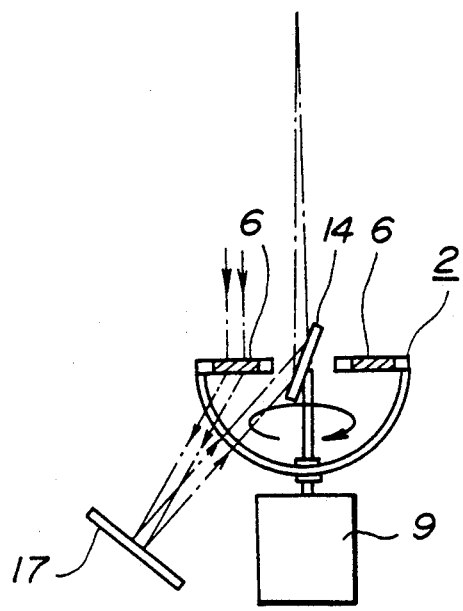
FIGS. 9 and 10 show modifications of the third embodiment of the present invention.
Figure 10:
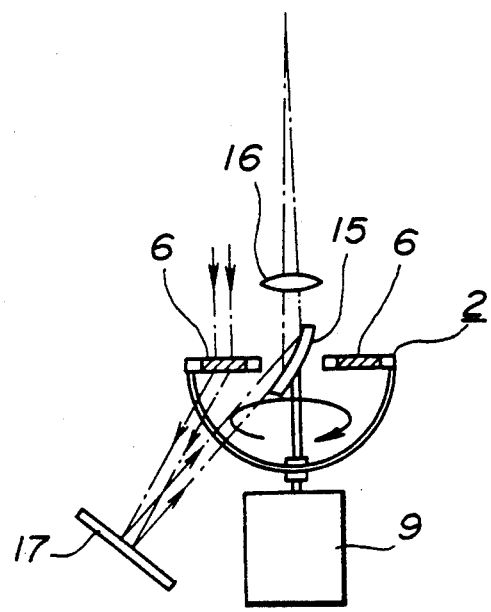

Referring to FIG. 8, it is assumed that the light beam is transmitted on a two-dimensional plane. When the hologram disc 2 rotates by $\theta$, the light beam reflected by the mirror 7 is inclined by $\theta$ to a reference line 1. Then the light beam reflected by the mirror 7 is incident to the grating 13 formed on the hologram disc 2, and the incident angle of the light beam is $2\theta$. That is, the light beam diffracted by the grating 13 is inclined by $3\theta$ to the reference line 1. Actually, the scanning is not performed on the two-dimensional plane so that the angle of the light beam inclined to the reference line 1 is less than $3\theta$. However, when the scanning is performed by the light beam which passes through an optical member such as the grating 13 formed on the hologram disc 2, the scanning angle generally becomes greater than the rotational angle of the hologram disc 2. Therefor, it is possible to expand the scanning angle of the light beam and to make the optical system which is provided between the semiconductor laser device 1 and the scanning lines 10 compact.

It is possible to use a mirror 14 as the optical member described above instead of the grating 13, as shown in FIG. 9. In this case, the mirror 14 is provided on the shaft of the motor 9 so as to be inclined at a predetermined angle. The mirror 14 is positioned at the center of the hologram disc 2 in the same manner as the grating 13 shown in FIG. 7A and is given the same rotational speed as the hologram disc 2. The light beam diffracted by the grating 6 formed on the hologram disc 2 is reflected by the mirror 17. Then the light beam reflected by the mirror 17 is reflected by the mirror 14 rotating with the hologram disc 2. The light beam reflected by the mirror 14 is focused at a predetermined position in space so that the scanning line is formed in space when the mirror 14 rotates.

It is also possible to use a curved surface mirror 15 and a lens 16 as the optical member described above instead of the grating 13, as shown in FIG. 10. In this case, the curved surface mirror 15 is provided on the shaft of the motor 9 so as to be inclined at a predetermined angle. The curved surface mirror 15 is positioned at the center of the hologram disc 2 and is given the same rotational speed as the hologram disc 2. The lens 16 is fixedly provided over the curved surface mirror 15. The light beam diffracted by the grating 6 is reflected by the mirror 17. The light beam reflected by the mirror 17 is reflected by the curved surface mirror 15 rotating with the hologram disc 2. Then, the light beam reflected by the curved surface mirror 15 passes through the lens 16 and is focused at a predetermined position in space so that the scanning line is formed in space when the curved surface mirror 15 rotates. In this case, if both the curved surface mirror 15 and the grating 6 formed on the hologram disc 2 have focusing function which focuses the light beam on the predetermined plane, it is unnecessary to make an optical path which reaches a optical detecting element (not shown in FIG. 10) long. Thus, it is possible to make a compact bar code scanner. Also, the signal-to-noise ratio of a signal outputting from the optical detecting element is prevented from decreasing. It is also possible to effectively detect the light beam.

A description will now be given of a fourth embodiment of the present invention with reference to FIGS. 11A through 12. In this type of bar code scanner, a projection optical path where the light beam emitted from the semiconductor laser device 1 reaches the surface of the medium recording the bar code and a detecting optical path where the light beam reflected by the medium recording the bar code reaches the optical detecting element are individually formed.

Figure 11A:
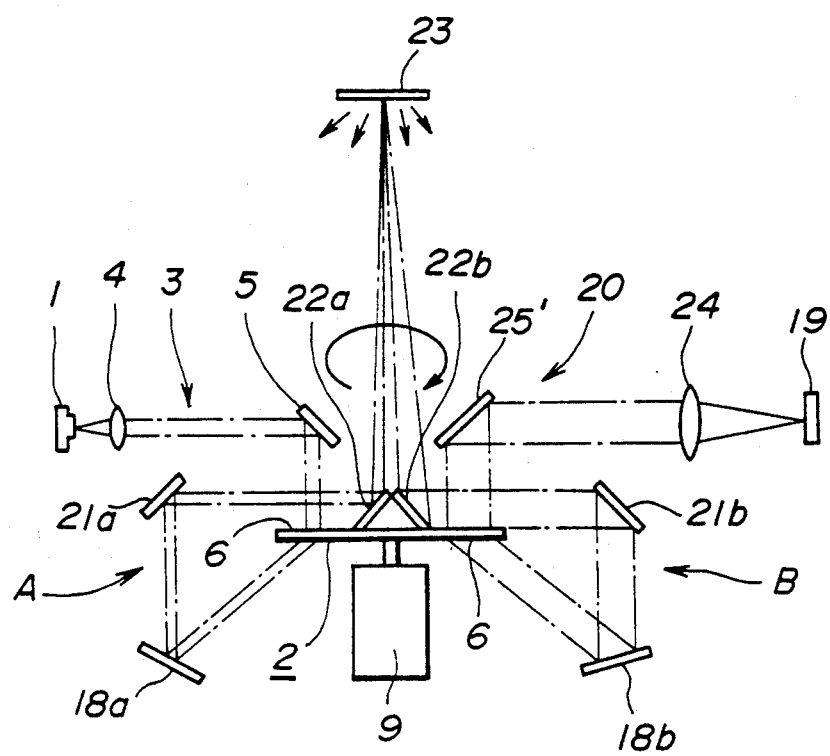
FIG. 11A shows a fourth embodiment of the present invention.
Figure 11B:
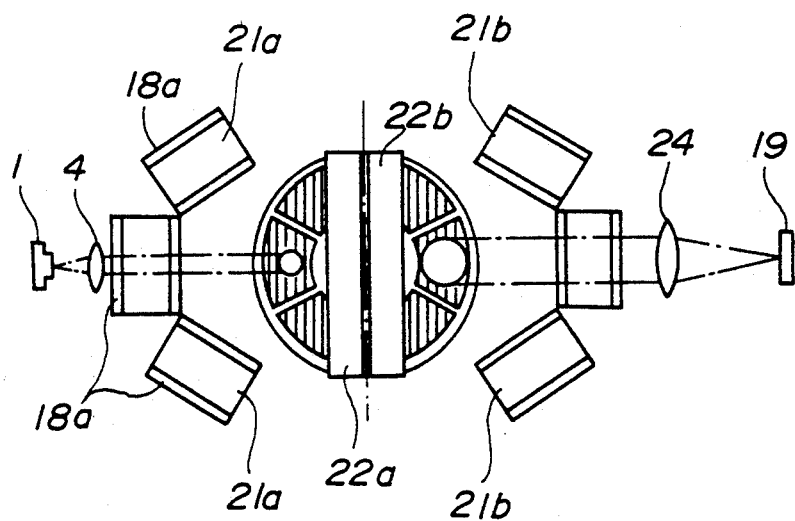
FIG. 11B is a plan view of the bar code scanner shown in FIG. 11A.

First, referring to FIGS. 11A and 11B, the hologram disc 2 is rotated by the motor 9. The light beam emitted from the semiconductor laser device 1 is, via the collimator lens 4 and the mirror 5, perpendicularly incident to the grating 6 formed on the hologram disc 2. A rotation mirror 21a and another rotation mirror 21b are mounted on the diameter line of the hologram disc 2. The light beam diffracted by the grating 6 is successively reflected by mirrors 18a and 21a and the rotation mirror 22a. Then, the light beam reflected by the rotation mirror 22a is projected onto the surface 23 of the medium recording the bar code. Due to the rotation of the hologram disc 2, the surface 23 of the medium recording the bar code is scanned by the light beam. A path which is formed from the semiconductor laser device 1, via the collimator lens 4, the mirror 5, the grating 6, mirrors 18a and 21a and the rotation mirror 2a, to the surface 23 of the medium recording the bar code is the projection optical path (A). The light beam reflected by the surface 23 of the medium recording the bar code is successively reflected by the rotation mirror 22b and mirrors 21b and 18b, and then the light beam reflected by the mirror 18b is incident to the grating 6 formed on the hologram disc 2. The light beam passing through the grating 6 is, via a mirror 25' and a lens 24, incident to the photo detector 19. A detecting optical system 20 is made up of the rotation mirror 22b, mirrors 21b,18b and 25, the lens 24 and the optical detector 19, and a path which is formed in the detecting optical system 20 is a detecting optical path (B). The projection optical path (A) and the detecting optical path (B) do not cross, and are individually formed. In this case, a first path which is formed from the rotation mirror 22a to the surface 23 of the medium in the projection optical path (A) and a second path which is formed from the surface 23 of the medium to the rotation mirror 22b are adjacent to each other. The first path and the second path are symmetrical. In this embodiment, the projection optical path (A) and the detecting optical path (B) are symmetrical to a predetermined plane.

In the conventional bar code scanner, the detection optical path has the same optical axis as the projection optical path so that a case occurs where the reflected light from the hologram disc is, as noise, detected by the photo detector. However, in this embodiment, the projection optical path (A) and the detecting optical path (B) are individually formed so that there is no case where the reflected light from the hologram disc is, as noise, detected by the photo detector. In addition, the projection optical path (A) and the detecting optical path (B) are symmetrical and are adjacent to each other so that it is difficult for a disturbance light to be incident to the photo detector 19. Thus, it is possible to increase the reliability of a detecting signal corresponding to the bar code.

Figure 12:
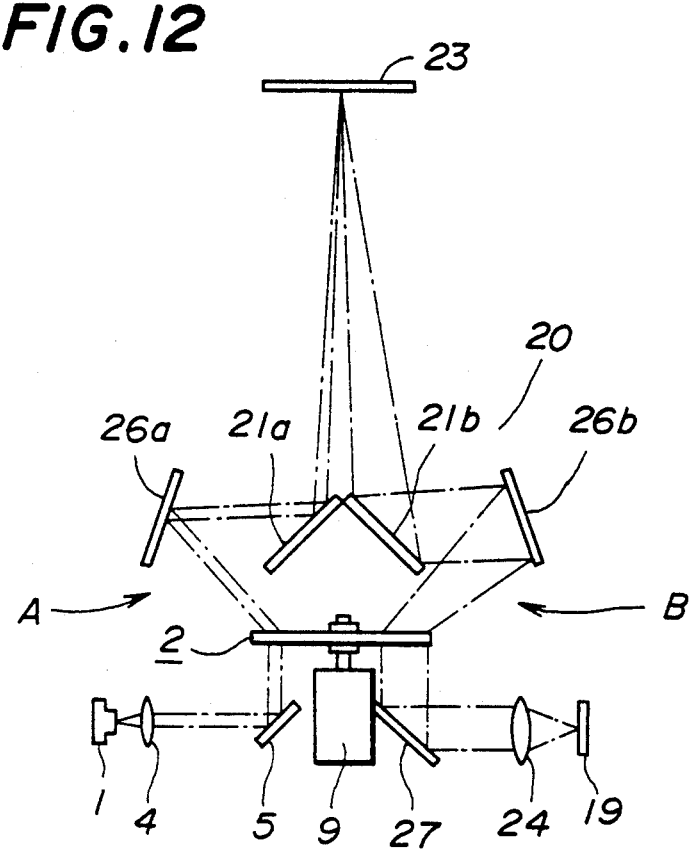
FIGS. 12 shows modifications of the fourth embodiment of the present invention.

Second, FIG. 12 shows a modification of the fourth embodiment. In FIG. 12, those parts which are the same as those shown in FIGS. 11A and 11B are given the same reference number. The light beam emitted from the semiconductor laser device 1 is, via the collimator lens 4 and the mirror 5, perpendicularly incident to the hologram disc 2 from a lower side thereof. Then the light beam passing through the hologram disc 2 is projected, via the mirror 26a and the rotation mirror 21a, onto the surface 23 of the medium. The light beam reflected by the surface 23 of the medium is, via the rotation mirror 21b and a mirror 26b, incident to the hologram disc 2 from an upper side thereof. The light beam passing through the hologram disc 2 is, via the mirror 27 and the lens 24, incident to the photo detector 19. In this modification, the projection optical path which is formed from the semiconductor laser device 1 to the surface 23 of the medium and the detecting optical path which is formed from the surface 23 of the medium to the photo detector 19 are respectively individually formed.

Figure 13A:
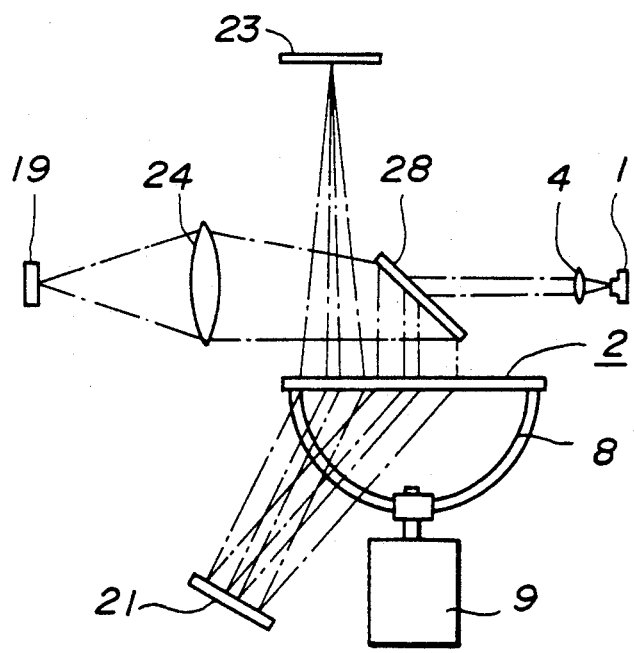
FIG. 13A shows a fifth embodiment of the present invention.
Figure 13B:
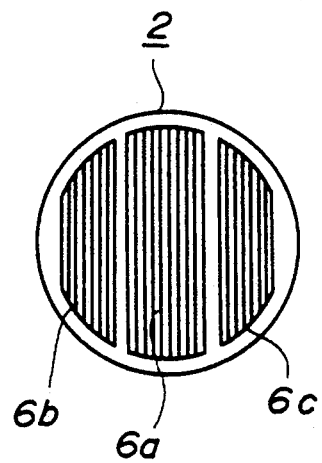
FIG. 13B is a plan view of a hologram disc used in the bar code scanner shown in FIG. 13A.

A description will now be given of a fifth embodiment of the present invention with reference to FIGS. 13A and 13B. In FIG. 13A, for the sake of simplicity, the detecting optical system 20 is omitted.

The hologram disc 2 is supported by the supporting frame 8 which is rotated by the motor 9. Three gratings 6a, 6b and 6c are formed on the hologram disc 2. The grating 6a is positioned at a center portion of the hologram disc 2, and each of the gratings 6b and 6c are formed on a respective side of the grating 6a on the hologram disc 2. The light beam emitted from the semiconductor laser device 1 is, via the collimator lens 4 and a semitransparent mirror 28, perpendicularly incident to the grating 6a from an upper side thereof. The light beam diffracted by the grating 6a is reflected by a mirror 21, and then, the light beam reflected by the mirror 21 is incident to the grating 6b or 6c from a lower side thereof. Then the light beam passing through the grating 6b or 6c is projected onto the surface 23 of the medium recording the bar code. The light beam reflected by the surface 23 of the medium is, via the grating 6b or 6c and the mirror 21, incident to the grating 6a. The light beam passing through the grating 6a is reflected by the semitransparent mirror 28, and then the reflected light beam is, via the lens 24, incident to the photo detector 19.

In this fifth embodiment, the light beam emitted from the semiconductor laser device 1 is perpendicularly incident to the grating 6a, and then passes through the two gratings 6a and 6b or 6a and 6c so that even if the wave length of the light emitted from the semiconductor laser device 1 changes the focused position of the light beam on the surface 23 of the medium substantially does not change.

According to the present invention, the light beam emitted from the light source is perpendicularly incident to the hologram member so that it is possible to prevent the position where the light beam is focused on the scanning surface from changing in the main scanning direction when the wave length of the light beam changes. Thus it is possible to provide a bar code scanner which has high reliability. The light bean diffracted by the grating formed on the hologram member is reflected by each of a plurality of the mirrors so that a plurality of scanning lines are formed. Thus, it is possible to provide a bar code scanner which is very accurate in reading the bar code. In addition, the light beam diffracted by the grating formed on the hologram is reflected by the common mirror, and then the light beam reflected by the common mirror is reflected by each of a plurality of mirrors so that it is possible to provide a bar code scanner which is compact.

The present invention is not limited to the aforementioned embodiments, and variations and modifications may be made without departing from the scope of the claimed invention.

What is claimed is:

1. A bar code scanner comprising:
   light source means for emitting a light beam;
   a hologram member on which a grating is formed, said hologram member rotating around a predetermined axis;
   incident optical means, provided between said light source means and said hologram member, for guiding the light beam emitted from said light source means to said grating of said hologram member so that the light beam perpendicularly projects onto said grating of said hologram member;
   a first optical system, provided between said hologram member and a medium on which a bar code is recorded, for guiding the light beam to said medium after passing through said grating formed on said hologram member, said first optical system comprising at least one mirror and an optical member, said mirror reflecting the light beam diffracted by the grating formed on said hologram member in the direction toward said optical member, said optical member rotating around the same axis as said hologram member and being positioned approximately on said axis, and said optical member receiving the light beam reflected by said mirror projecting the light beam onto said medium;
   detection means for detecting the light beam reflected by said medium; and
   a second optical wave system, provided between said medium and said detection means, for guiding the light beam reflected by said medium to said detection means.

2. A bar code scanner as claimed in claim 1, wherein said optical member has a grating, the light beam passing through said grating of said optical member projected onto said medium.

3. A bar code scanner as claimed in claim 2, wherein said grating of said optical member is formed at a center portion of said hologram member.

4. A bar code scanner as claimed in claim 3, wherein said grating of said optical member has the same diffraction direction as said grating formed on said hologram to which the light beam from said incident optical means is incident.

5. A bar code scanner as claimed in claim 1, wherein said optical member has a mirror, by which the light beam is reflected, said light beam being projected onto said medium.

6. A bar code scanner as claimed in claim 1, wherein said optical member has a curved surface mirror and a lens, the light beam being reflected by said curved surface mirror and passing though said lens so as to be projected onto said medium.

7. A bar code scanner comprising:
   light source means for emitting a light beam;
   a hologram member on which a grating is formed, said hologram member rotating around a predetermined axis;
   incident optical means, provided between said light source means and said hologram member, for guiding the light beam emitted from said light source means to said grating of said hologram member so that the light beam perpendicularly projects onto said grating of said hologram member;
   a first optical system, provided between said hologram member and a medium on which a bar code is recorded, for guiding the light beam to said medium after passing through said grating formed on said hologram member;
   detection means for detecting the light beam reflected by said medium; and
   a second optical system, provided between said medium and said detection means, for guiding the light beam reflected by said medium to said detection means;
   wherein a projection optical path extending from said light source means to said medium via said incident optical means, said hologram member and said first optical system and a detecting optical path extending from said medium to said detection means via said second optical system are individually formed, said projection optical path and said detecting optical path being symmetrical to each other on the axis around which said hologram member rotates.

8. A bar code scanner as claimed in claim 7, wherein said first optical system has a first mirror for reflecting the light beam transmitted by said projection optical path so that the light beam projects onto said medium, and said second optical system has a second mirror for reflecting the light beam reflected by said medium,
   and wherein a first path formed between said first mirror and said medium and a second path formed between said medium and said second mirror are adjacent to each other.

9. A bar code scanner as claimed in claim 8, wherein said first mirror and said second mirror are provided on said hologram member.

10. A bar code scanner as claimed in claim 8, wherein said first mirror and said second mirror are respectively separated from said hologram member.

11. A bar code scanner comprising:
    light source means for emitting a light beam;
    a hologram member on which a grating is formed, said hologram member rotating around a predetermined axis;
    incident optical means, provided between said light source means and said hologram member, for guiding the light beam emitted from said light source means to said grating of said hologram member so that the light beam perpendicularly projects onto said grating of said hologram member;
    a first optical system, provided between said hologram member and a medium on which a bar code is recorded, for guiding the light beam to said medium after passing through said grating formed on said hologram member, said first optical system comprising a common mirror to which the light beam diffracted by said grating formed on said hologram member is incident and a plurality of mirrors which are arranged around said hologram member, each of the mirrors reflecting the light beam reflected by said common mirror, and the light beam reflected by each of the mirrors forming a scanning line;
    detection means for detecting the light beam reflected by said medium; and
    a second optical system, provided between said medium and said detection means, for guiding the light beam reflected by said medium to said detection means.

* * * * *